(12) United States Patent
Schlueter et al.

(10) Patent No.: US 11,354,806 B2
(45) Date of Patent: Jun. 7, 2022

(54) DETECTION OF REGIONS WITH LOW INFORMATION CONTENT IN DIGITAL X-RAY IMAGES

(71) Applicant: KONINKLIJKE PHILIPS N.V., Eindhoven (NL)

(72) Inventors: Mathias Schlueter, Ahrensburg (DE); Andre Goossen, Radbruch (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 77 days.

(21) Appl. No.: 16/500,851

(22) PCT Filed: Jul. 24, 2018

(86) PCT No.: PCT/EP2018/069959
§ 371 (c)(1),
(2) Date: Oct. 4, 2019

(87) PCT Pub. No.: WO2019/025225
PCT Pub. Date: Feb. 7, 2019

(65) Prior Publication Data
US 2020/0380686 A1    Dec. 3, 2020

(30) Foreign Application Priority Data
Aug. 2, 2017 (EP) .................................. 17184418

(51) Int. Cl.
*G06K 9/62*    (2022.01)
*G06T 5/20*    (2006.01)
(Continued)

(52) U.S. Cl.
CPC .............. *G06T 7/11* (2017.01); *G06K 9/6279* (2013.01); *G06T 5/20* (2013.01); *G06T 5/40* (2013.01);
(Continued)

(58) Field of Classification Search
None
See application file for complete search history.

(56) References Cited

U.S. PATENT DOCUMENTS 5,268,967 A    12/1993 Jang
5,606,587 A    2/1997 Barski
(Continued)

FOREIGN PATENT DOCUMENTS

JP    H11191844 A    7/1999
JP    2001160903 A   6/2001
(Continued)

OTHER PUBLICATIONS

PCT International Search Report, International application No. PCT/EP2018/069959, dated Sep. 20, 2018.
(Continued)

*Primary Examiner* — Soo Shin
(74) *Attorney, Agent, or Firm* — Larry Liberchuk

(57) ABSTRACT

An image processing system and related method. The system comprises an input interface (IN) configured for receiving an input image. A filter (FIL) of the system filters said input image to obtain a structure image from said input image, said structure image including a range of image values. A range identifier (RID) of the system identifies, based on an image histogram for the structure image, an image value sub-range within said range. The sub-range being associated with a region of interest. The system output through an output interface (OUT) a specification for said image value sub-range. In addition or instead, a mask image for the region of interest or for region or low information is output.

14 Claims, 6 Drawing Sheets

(51) Int. Cl.
*G06T 5/40* (2006.01)
*G06T 7/00* (2017.01)
*G06T 7/11* (2017.01)
*G06T 7/136* (2017.01)
*G06V 10/25* (2022.01)

(52) U.S. Cl.
CPC ............ *G06T 7/0012* (2013.01); *G06V 10/25* (2022.01); *G06T 2207/10116* (2013.01); *G06T 2207/30004* (2013.01)

(56) References Cited

U.S. PATENT DOCUMENTS

| | | | |
|---|---|---|---|
| 6,112,112 | A | 8/2000 | Gilhuijs |
| 7,840,066 | B1 | 11/2010 | Chen |
| 8,941,609 | B2 | 1/2015 | Chen |
| 8,958,620 | B2 | 2/2015 | Dwivedi |
| 2001/0042068 | A1 | 11/2001 | Yoshida |
| 2004/0170308 | A1* | 9/2004 | Belykh ............ G06T 5/30 382/128 |
| 2006/0029183 | A1 | 2/2006 | Borghese |
| 2008/0037897 | A1* | 2/2008 | Chiang ............ G06T 5/40 382/273 |
| 2008/0118139 | A1* | 5/2008 | Huo ............ G06T 5/40 382/132 |
| 2013/0016906 | A1 | 1/2013 | Kakino |
| 2013/0257869 | A1* | 10/2013 | Lao ............ G06T 15/08 345/424 |
| 2016/0321809 | A1* | 11/2016 | Chukka ............ G16H 30/20 |
| 2017/0098310 | A1* | 4/2017 | Chefd'hotel ............ G06T 7/136 |
| 2018/0180830 | A1 | 6/2018 | Kawamura |

FOREIGN PATENT DOCUMENTS

| | | |
|---|---|---|
| WO | WO2009110850 A1 | 9/2009 |
| WO | WO2016083248 A1 | 6/2016 |
| WO | WO2017037147 A1 | 3/2017 |
| WO | WO2017098007 A1 | 6/2017 |

OTHER PUBLICATIONS

Giordano D. et al., "Epiphysis and Metaphysis Extraction and Classification by Adaptive Thresholding and DoG Filtering for Automated Skeletal Bone Age Analysis", Engineering in Medicine and Biology Society (EMBC), 2013 35th Annual International Conference of the IEEE, Aug. 1, 2007 (Aug. 1, 2007), pp. 6551-6556, XP055415693.

Paolo Costantini et al., "Shape Preserving Histogram Approximation", Advances in Computational Mathematics, Kluwer Academic Publishers, DO, vol. 26, No. 1-3, Aug. 10, 2006 (Aug. 10, 2006), pp. 205-230, XP019477100.

Todd A. Sasser et al: "Segmentation and Measurement of Fat Volumes in Murine Obesity Models Using X-ray Computed Tomography", Journal of Visualized Experiments, No. 62, Apr. 4, 2012 (Apr. 4, 2012), XP055415714.

Brox T. et al., "Level Set Based Image Segmentation with Multiple Regions", In Pattern Recognition, Springer LNCS 3175, C.-E. Rasmussen, H. Bulthoff, M. Giese, and B. Scholkopf (Eds.), pp. 415-423, Tübingen, Germany, Aug. 2004, Springer-Verlag Berlin Heidelberg 2004.

Boykpv Y. Y. et al, "Interactive Graph Cuts for Optimal Boundary & Region Segmentation of Objects in N-D Images", Proceedings of "International Conference on Computer Vision", Vancouver, Canada, vol. I, pp. 105-112, Jul. 2001.

McLachlan G. J. et al., "The EM Algorithm and Extensions", Wiley Series in Probability and Statistics, p. 68, section 2.7, 1997.

Petrou M. et al, "Image Processing the Fundamentals", J. Wiley & Sons Ltd, 1999, p. 125.

Dempster et al., "Maximum Likelihood from Incomplete Data via the EM Algorithm", Journal of the Royal Statistical Society. Series B (Methodological), vol. 39, No. 1, (1977), pp. 1-38.

* cited by examiner

DETECTION OF REGIONS WITH LOW INFORMATION CONTENT IN DIGITAL X-RAY IMAGES

FIELD OF THE INVENTION

The invention relates to an image processing system, an image processing method, an imaging arrangement, a computer program element, and a computer readable medium.

BACKGROUND OF THE INVENTION

For high-quality rendering of an anatomical image, in particular of an X-ray image, brightness and contrast of the displayed visualization have to be adapted accordingly, a procedure sometimes called "window level and-width" selection. In this procedure, a certain region of interest is mapped to brightness values and the contrast has to be adjusted such that an intensity range for the region of interest corresponds to a range of the display unit used. However, clinical X-ray images contain very often regions with low information content, which means that these regions have no diagnostic relevance. Examples are direct radiation regions or shadows of radiation-opaque objects, such as X-ray protectors. The presence of these low information content regions may make the visualization of the image difficult and the above mentioned adaptations cumbersome.

SUMMARY OF THE INVENTION

There may be a need for a system or method to improve visualization of image data.

The object of the present invention is solved by the subject matter of the independent claims where further embodiments are incorporated in the dependent claims. It should be noted that the following described aspect of the invention equally applies to the image processing method, the imaging arrangement, to the computer program element and to the computer readable medium.

According to a first aspect of the invention there is provided an image processing system, comprising:

an input interface configured for receiving an input image;

a filter configured to filter said input image to obtain a structure image from said input image, said structure image including a range of image values;

a range identifier configured to identify, based on an image histogram for said structure image, an image value sub-range within said range, said sub-range being associated with a region of interest (ROI) in the input image;

an output interface for outputting i) a specification for said image value sub-range and/or ii) a mask image associated with the sub-range and configured to indicate the ROI, and/or a complementary mask image associated with the complement of said sub-range, and configured to indicate the complement of said region of interest; and an image value range evaluator configured to compute a respective weight for the image values outside the sub-range, said weight determining a contribution of the respective image values in a visualization of the input image, wherein said weight measures a goodness of separation between at least at least two classes, one corresponding to the region of interest and the at least one other corresponding to the background or to at least one radio-opaque object.

The complement of the ROI is referred to herein as regions of low information content (RLI) in the input image. The respective masks are configured to indicate the ROI or RLI in the input image.

The input image is filtered or transformed to a structure image. In the structure image, global gradients possibly present in the input image, are reduced or removed. The histogram analysis is then performed on that structure image. With the proposed system, regions with low information content such as background or opaque objects can be distinguished from regions of interest. The identified sub-range relates to said regions of interest at the exclusion of the regions of low information content The system is robust against global gradients. A global gradient includes in particular large scale gradients, e.g. those caused by inhomogeneous intensity of radiation or varying thickness in radio-opaque objects.

The low information regions have typically either high or low intensities and would disturb the window level and-width adjustment procedure in rendering where a histogram-based determination of intensity mean and range corresponding to the region of interest may be carried out. Moreover, low information regions can vary strongly in size which leads to an instable brightness and contrast impression. Visualization of anatomic imagery can be significantly improved with the proposed system which is configured to identify regions of interest and distinguish same from said low information regions. The low information regions can then be excluded from rendering, in particular can be excluded when determining any one of the following parameters: brightness, contrast, mean intensity or range for the input image.

According to one embodiment, the system further comprises a histogram former configured to form said image histogram by forming said image histogram from image values in the structure image or, further comprising a histogram transformer, the histogram former configured to i) form an intermediate image histogram for image values in the structure image and the histogram transformer configured to transform said intermediate image histogram into said image histogram or ii) to transform the input image into an intermediate image and to the form the histogram from said intermediate image.

Forming the histogram as per options ii),iii), allows to support the identification operation when the underlying algorithm expects a shape (eg, mixture of Gaussians) of the histogram. The underlying identification algorithm may then run more accurate, robust and or faster.

According to one embodiment, the histogram transformer is configured to apply an area preserving interpolation when transforming the intermediate image histogram. This makes the identification operation more accurate and robust. This embodiment is of particular benefit, if, for instance, gaps ("holes") would otherwise emerge in the transformed histogram.

According to one embodiment, the system further comprises an image renderer configured to render a visualization on a display unit of said input image based on the mask for the region of interest. In particular, image values outside the mask are not taken into account for rendering, e.g. when performing a histogram based analysis to determine brightness values and contrast in relation to window level and-width settings, etc. This implements a hard-exclusion scheme.

According to one embodiment, the or an image renderer is configured to render a visualization on a display unit of said input image whilst a contribution, for a contrast and/or brightness adaptation, of an image value outside the ROI is according to said weight. In other words, the weights allow to better control which values are to be excluded from the rendering. The exclusion can be used to implement a fuzzy exclusion scheme rather than the hard-exclusion scheme mentioned earlier.

According to one embodiment, the image renderer configured to render a visualization on a display unit of said mask for the complement of the region of interest, preferably with a visualization scheme that represents the weight computed by the image value range evaluator.

According to one embodiment, the range identifier is configured to identify said sub-range by fitting a statistical mixture model to the image histogram or to the transformed image histogram. The mixture model represents two or more components or classes. In particular, according to one embodiment, the sub-range is computed as a threshold that measures a (preferably statistical) separation between two classes of interest, in this example the ROI and the RLI. In one embodiment, the identification is based on optimizing (specifically, minimizing) the statistical separation. Yet more specifically, the statistical separation error is used in one embodiment that measures the probability for wrongly classifying with the threshold. Other quantities or criterions for identifying the two or more classes are also envisaged.

As mentioned, according to one embodiment, the statistical mixture model includes at least two such components or classes. Specifically, and according to embodiment, one of the components corresponds to RLI (including background or a radio-opaque objects or other) whilst the at least one other component corresponds to the ROI, that is the one or more anatomical structures of interest.

In an embodiment mainly envisaged herein, the statistical mixture model includes at least three components, wherein the at least one further component corresponds to an edge structure.

This type of tripartite classification has been found to be particularly realistic for medical imagery, in particular X-ray. In the statistical mixture model, the image is thought to arise from a mixed distribution with respective, different, probability distributions for the three classes.

According to a second aspect there is provided a method of image processing, comprising the steps of:
  receiving an input image;
  filtering said input image to obtain a structure image from said input image, said structure image including a range of image values at different image locations;
  identifying, based on an image histogram for said structure image, an image value sub-range within said range, said sub-range being associated with a region of interest; and
  outputting i) a specification for said image value sub-range and/or ii) a mask image associated with the sub-range and configured to indicate the region of interest, and/or iii) a complementary mask image associated with the complement of said sub-range, and configured to indicate the complement of said region of interest, and
  computing a respective weight for the image values outside the sub-range, said weight determining a contribution of the respective image values in a visualization of the input image, wherein said weight measures a goodness of separation between at least at least two classes, one corresponding to the region of interest and the at least one other corresponding to the background or to at least one radio-opaque object.

According to one embodiment, the method includes a step of forming said image histogram by forming said image histogram from image values in the structure image or, the step further comprises forming an intermediate image histogram for image values in the structure image and the histogram transformer configured to transform said intermediate image histogram into said image histogram or ii) to transform the input image into an intermediate image and to the form the histogram from said intermediate image.

According to one embodiment, the step of transforming includes applying an area preserving interpolation when transforming the intermediate image histogram.

According to one embodiment, the method includes a step of rendering a visualization on a display unit of said input image based on the mask for the region of interest.

According to one embodiment, the method further includes a step of computing a respective weight for the image values outside the sub-range, said weight determining a contribution of the respective image values in a visualization of the input image.

According to one embodiment, the step of rendering includes rendering a visualization on a display unit of said mask for the complement of the region of interest, preferably with a visualization scheme that represents the computed weight.

Specifically, an according to one embodiment, the step of rendering includes rendering a visualization on a display unit of said input image whilst a contribution of the image values inside the RLI for a contrast and/or brightness adaptation is according to said weight.

According to one embodiment, the step of identifying the sub-range is based on fitting a statistical mixture model to the image histogram or to the transformed image histogram.

According to a third aspect there is provided an imaging arrangement, comprising:
  an imaging apparatus and a system as described above.

According to a fourth aspect there is provided a computer program element, which, when being executed by at least one processing unit, is adapted to cause the processing unit to perform the method as any one of the embodiments as described above.

According to a fifth aspect there is provided a computer readable medium having stored thereon the program element.

The "structure image" as envisaged herein is one where the image values encode different properties than the input image. The input image encodes physical properties (such as attenuation etc. as detected by a detector) whereas the individual image elements of the structure image encodes local gradients or differences across or within neighborhoods of the initial input image. As compared to the input image from which the structure image is obtained large-scale gradients are reduced or even entirely eliminated.

BRIEF DESCRIPTION OF THE DRAWINGS

Exemplary embodiments of the invention will now be described with reference to the following drawings wherein.

DETAILED DESCRIPTION OF THE EMBODIMENTS

Figure 1:
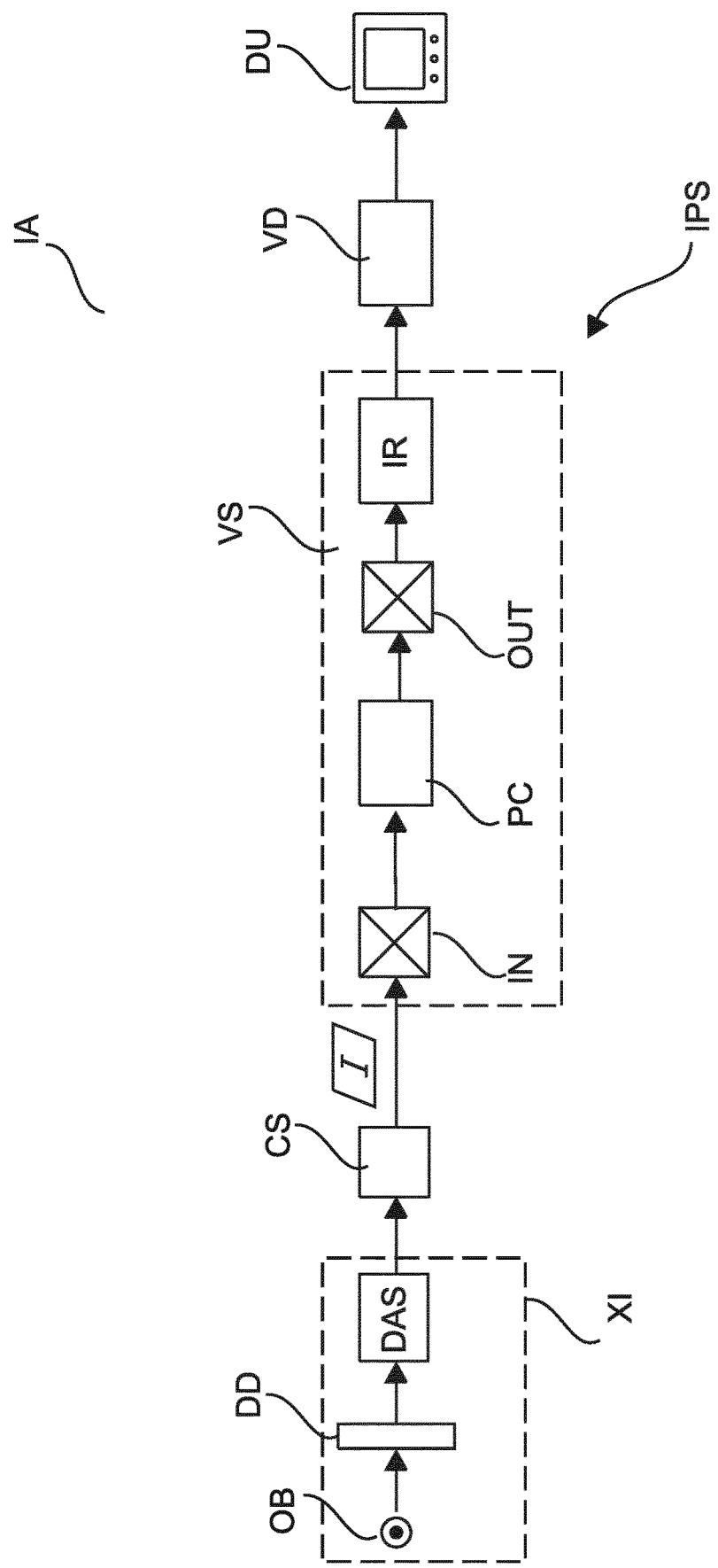
FIG. 1 shows a schematic block diagram of an image processing arrangement including image processing system.

With reference to FIG. 1 there is shown a block diagram of an imaging arrangement IA, comprising an image acquisition apparatus XI ("imager") and an image processing (sub-)system IPS that supports visualization of, in particular, image data acquired by the imaging apparatus XI.

The image processing system IPS ("IPS") supports in particular visualization of the image data. The image processing system IPS can be implemented as a software routine in a (medical image) viewing platform executed on a general purposed computing unit or on a dedicated workstation PU. Image (raw) data supplied by the image acquisition apparatus XI can be processed by the IPS in a manner to be described in more detail below to produce images viewable on a display device DU such as a computer monitor or the display screen of a portable communication device (smartphone, tablet, etc). The image data as supplied by the image acquisition apparatus XI can be transferred to the IPS in a wired or wireless network or by any other means (eg by USB dongle, etc). The IPS may be also implemented as a (dedicated) FPGA (A field-programmable gate array) or as hardwired chip. The IPS may be integrated into a dedicated graphics chip or graphics processor of the computing unit or work station PU associated with the imager XI.

The image data as supplied by the image acquisition apparatus XI can be 2D (two-dimensional) 3D (three-dimensional). Examples of the image acquisition apparatus XI envisaged herein are a 2D radiography system or a fluoroscopy system, or a C-arm system, a computed tomography scanner (CT), a magnetic resonance imager MRI or any other imaging modality such as an ultrasound imaging system, etc.

The image acquisition apparatus XI is particularly envisaged for medical applications although other fields of applications are not excluded herein. The image acquisition apparatus XI is particular configured to acquire image signals about the internals of an object OB of interest although processing of image signals representative of the outside of the object OB of interest is not excluded herein. For brevity, the term "object of interest" OB as used herein includes animate or inanimate objects. In particular, the object is a human or animal patient or a part thereof, such as particular anatomy (thorax, abdomen, extremities, etc).

In general, the image acquisition apparatus XI is capable of producing an interrogating signal to interrogate for the internal structure of the object. Examples of such an interrogating signal are X-ray radiation or other electro-magnetic radiation or non-electromagnetic signals such as ultrasound etc. In X-ray imaging, the imaging apparatus includes an X-ray source. The interrogating signal interacts with the object to modulate a response signal which is detected with a detection device DD. For instance, in the radiography embodiment, the detection device DD is an X-ray sensitive detector. In MRI the detection, device DD comprises coils to pick-up electromagnetic pulses. In ultrasound, the detector device is a transducer configured to pick up ultrasound reflections, etc. That is, depending on the imaging modality used, the detection device is suitably configured to pick up the respective type of response signal. In X-ray, the imaging apparatus may include a collimator to restrict exposure.

The detected signals are then digitized into intensity values by a data acquisition unit DAS. The digitalized intensity data may then be processed by conversion circuitry CS to convert the intensity data into image values in a suitable numerical format, such as a range of Hounsfield units (CT numbers) used in CT.

The so converted intensity values are then forwarded as image values raw image data to the IPS to produce brightness signals for color or grey value visualization at its output OUT which can be used to drive video circuitry VD of the imaging system which in turn controls the monitor DU to produce a visualization in color values, of the (possibly format-converted) intensity values on the display unit DU. "Color values" are used herein in a general, computer graphics, sense, so include in particular black, white and grey values and "color value" is not meant to be restricted to color imaging in the narrow sense such as RGB (red-green-blue) coding, etc. It will be understood that the intensities may be passed through further signal processing stages before being processed by the IPS. For instance, in the CT embodiment, before conversion into the HU format, the intensity values are processed by a reconstruction module (not shown) that implements a suitable reconstruction algorithm (e.g. (filtered)-backward-projection (F)BP, statistical, algebraic or other iterative reconstruction techniques, etc.). The reconstruction operates on the acquired intensities (which are projections through the object along manifold directions) to reconstruct for a 3D set of intensity values and it is this 3D block of intensities that is then converted into HU format and forwarded for processing by the IPS.

As briefly mentioned, the intensity values as acquired by the image acquisition apparatus XI may encode information about the internal structure, e.g., configuration or composition of the object OB to be imaged. Depending on the interrogating signals used, the internal structure or composition of the object modulates a certain pattern onto the response signal. This pattern or modulation is maintained after conversion into suitable number range and is encoded in the image data as a spatial variation across the digital image data. More particularly the image data is organized into image files (the "image") including image elements. The image elements may also be referred to as "pixels" (for 2D imaging) or "voxels" (for 3D imaging). Image elements in each image file are organized into a suitable data structure such as a 2D matrix for 2D imaging. Without limiting the generality of what is described below and with exemplary reference to 2D imaging, an image element comprises a spatial image location ($x=(x_1,x_2)$). Associated with each image location is a number, that is, the respective image value/intensity value that represents the quantity of interest, e.g., in X-ray imaging, an aspect of X-ray interaction such as attenuation or phase contrast, etc. The numerical image values represent local intensities of the interrogating signal, for instance of X-ray radiation. The set of all the different image values in an image define the range of the image.

Variations of the image values across those image elements can be thought then to represent certain structures of interest. Of particular interest in the image data are those sub sets of image elements (regions of interest) that represent transitions of configuration (such as material thickness or orientation) or composition in the imaged object. For instance, transitions from one material type (in particular tissue) to another or between background tissue and bone or any other types of transitions of interest. Other parts of pixel subsets of the image may relate to regions (also called "areas") of low information content, such as background or regions that represent direct exposure or no exposure at all. An example of no-exposure regions are shadows or radiation opaque objects such as protectors, markers, collimator blades, or other foreign objects not part of the object OB to be imaged. As used herein, regions of low information content ("RLI") are those that represent no or few such transitions, that is regions that have about zero or low gradients (as compared to other regions in the image). Conversely, region(s) outside the RLI represent region(s) of interest ("ROI"), or the set-theoretic complement of the RLI includes such ROI(s). The RLIs and/or the ROIs may or may not be topologically connected.

Figure 2:
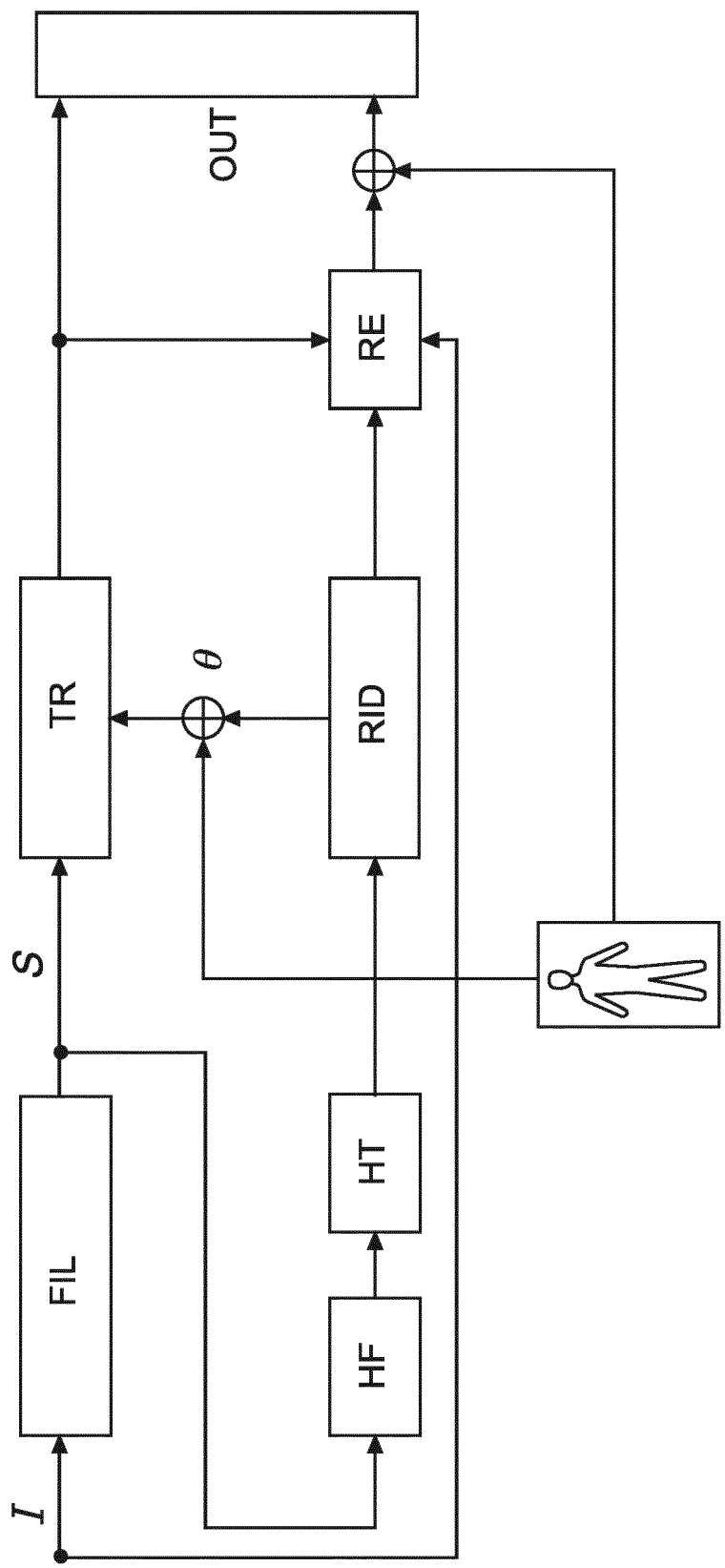
FIG. 2 shows in more detail a block diagram of a processing component of an image processing system of FIG. 1.

To prepare the image values for visualization, the IPS includes an image renderer IR (shown in FIG. 2). Operation of the image renderer IR ("renderer") is based on a transfer function. The transfer function is configured to map intensity values into a suitable range of brightness values. The range of brightness values and contrast is determined by the correct window level and-width settings. The window level and-width settings are determined automatically or manually. The rendering operation may include a histogram analysis (such as histogram equalization or others) to determine the brightness values or intensity mean or contrast, etc or the rendering operation may include changing a variance of image values. The brightness values with the mapping and the corresponding contrast are then passed to the video circuitry VD to control the actual visualization of the image data on screen DU. See "Image processing: The Fundamentals", Maria Petrou and Panagiota Bosdogianni, John Wiley & Sons, 1999, p 132, section "Is there an alternative to histogram manipulation?".

The image range, that is, the dynamics, of all image values can be quite large and differences between the same can be quite subtle, in particular when including the image values of the region of low information content ("RLI"). Therefore, taken the entire range of intensity values into account for rendering, for instance by mapping the entire range of intensity values to a given brightness range, may produce a visualization where those possibly minute changes may simply not be discriminable.

Very broadly, the proposed image processing system IPS includes a processing component PC configured to process imagery I. The imagery may be supplied direct by the imager or may be retrieved from image storage such as a PACS (Picture archiving and communication system) of a HIS (hospital information system) or may be obtained otherwise. The processing component PC as proposed herein processes the imagery I to, preferably fully automatically, identify one or more ROI(s) at the exclusion of the RLIs which are complementary to the ROI(s). The rendering may then focus on these ROI(s) and the exclusion of the RLI(s). To do this, the processing component filters the imagery I to obtain a structure image S. A histogram analysis is then performed on the structure image S. Initially, the structure image has a total range of image values. The histogram analysis by the processing component PC then yields at least one sub-range of image values. The sub-range identified in the histogram analysis corresponds to the regions of interest, such as anatomies, at the exclusion of said RLIs. In one embodiment the analysis yields a threshold which can then be used to specify the sub-range of image values, as for example high structure image values, that correspond to ROIs. From these one or more thresholds, a (binary) mask image can then be formed to distinguish the ROIs from the RLIs. More than one threshold may be computed for different ROIs. The set-theoretic union of these ROIs then define a total ROI. The thresholds(s) may be one-sided or may be defined by two finite bounds.

Preferably, based on the threshold or mask, the input image may be rendered for visualization on the display unit DU. Rendering by renderer IR includes mapping only the values of the input image for the ROI to brightness values for controlling illumination of pixels of the display unit DU by video circuitry VD. Input mage values for the RLI are disregarded for the said mapping or, in general, for the rendering operation. This allows avoiding that valuable contrast range is expended on the said RLIs. The range of contrast available can now be fully exploited for the region of actual interest ROI, such as those parts of the imagery that relate to anatomic structures, or whatever structures one wishes to image for. In the preferred embodiment the processing component uses a statistical approach to analyze the histogram of the structure image. Performing a histogram analysis of the structure image S allows reducing the possible influence of global gradients which may be present in the input image I. In one embodiment, the proposed statistical approach uses a mixed model fitting. A parameterized probability density model is fitted to the structure histogram. Applicant has discovered that the input imagery, especially in a medical context, can be thought of as encoding essentially three classes of information. These classes can be thought of as latent variables. There is a first class, namely the RLIs, a second class (of primary interest herein) that represents the anatomic data and then there is a third class that corresponds to edge data that defines edges between anatomy, background and/or a collimation area. The processing component is configured to cluster the information in the cluster histogram for these three classes. Once the histogram data of the structure image has been analyzed into these three clusters, a thresholding may be performed for any pair of clusters, in particular between the RLI class and anatomic class. A separation criterion can be defined in one embodiment to fully automatically find the threshold that best separates said two classes of interest, or any other two classes from the three classes. The three classes are represented by three, respectively different probability densities and the structure histogram is thought to arise as a combination of these three probability densities. Properties of the probability densities and/or associated distributions can then be used to separate the classes to find the threshold.

Although proceeding on a three-class mixture model has been found to work well in a medical context, two or four, or more classes may also be used in other applications.

Although a statistical approach for distinguishing the ROIs from the RLIs is mainly envisaged herein, such as the mixed model fitting, other statistical techniques may also be used with benefit, such as Hidden Markov Models, or other. Even non-statistical methods are contemplated herein, such as principle component analysis or other separation schemes. Hyperplane fitting may be used for the separation. Instead of operating directly on the structure histogram, a remapped histogram may be optionally computed first from the structure histogram and the above mentioned processing is performed instead on the remapped histogram.

The threshold computed by the PC allows specification of the sub-range. For instance, in a hard-thresholding, image values in the structure image below the said threshold are ignored (and deemed to relate to the RLIs) for the rendering. This specification allows defining a binary mask image comprising 1's and 0's which allows to then distinguish ROIs from the RLIs. Rendering of the input image I can then be performed as explained above by mapping input image values inside the ROI on a suitable brightness range as per the mask associated with the threshold. Based on the ROI, a new histogram of the input image values is formed by the renderer to determine the brightness and contrast setting in the window level and-width procedure. These settings are then passed on to the video circuitry VD which then effects the desired visualization on the display unit DU with these settings. In addition or instead, the binary mask image may be rendered. The mask may be displayed superimposed on the structure image or the input image or the mask may be displayed separately.

There is a natural 1-to-1 registration between the input image and the structure image, as the latter is a filtered version of the former, both having the same extension and (pixel) size. Therefore, the mask determined on the structure image S can be superimposed to the input image or used in the window level and-width procedure or other (possibly histogram-based) rendering operations applied to the input image.

Optionally, the processing component may be configured to compute a significance value or index, that measures, against a pre-defined criterion, how well the threshold separates any two of the classes. The significance value may be visualized.

With continued reference to block diagram in FIG. 2, the processing component PC will now be explained in more detail. The IPS's processing component PC includes an input port IN at which digital input image I is received. The input image I includes intensity values arranged in pixels. A format of the digital input image I is either linear or logarithmic.

The filter stage FIL is then applied to the input image I to produce the structure image. The filter FIL is preferably an edge filter but other suitable filters may be used instead.

A histogram former HF then operates on the structure image to produce the histogram for the structure image ("structure histogram"). The image values in the structure image may now be also referred to herein as "structure amplitudes" as the image values in the structure image no longer represent the physical quantity encoded in the input image. Instead, magnitude of the image values in the structure image represents the amount by which the physical quantity varies locally, expressed in terms of local gradients, differences etc.

The structure histogram represents the distribution of these structure amplitudes in the structure image. The structure histogram records magnitude of structure amplitude versus occurrence at image locations in the structure image S.

A range identifier RID operates, in one embodiment, on the structure histogram produced by the histogram former HF to identify the—sub range for the ROI to distinguish from image values for the RLIs. It will be understood that because of complementarity, identification of the sub-range for the ROI also identifies a sub-range for RLIs. Therefore, identification of the sub-range for the ROIs may be achieved by identification of the sub-range for the RLIs. However, for clarity and to avoid undue and cumbersome wording, it will be assumed herein that the identification operation of the RID relates to the sub-range for the ROIs.

The identification operation of the sub-range for the ROIs by the RID includes in one embodiment, fitting a statistical mixed model to the structure histogram and then to determine, given a separation criterion, the threshold $\theta$ as the best separation between any two of the probability densities computed in the mixed model fitting.

A thresholder TR then uses the threshold so found to form a mask image from the structure image. The mask may then be output for display or for controlling rendering of the input image.

Optionally but preferably, there is also a histogram transformer HT that transforms the shape of the original histogram as produced by the histogram former HF, into a transformed histogram. Operation of the RID is then performed not on the original structure histogram but on the so transformed structure histogram produced by the histogram transformer HT. Using such a histogram transformer HT has been found to be beneficial where the mixed model fitting in the RID is based on certain shape requirements for the function type used in the fitting. Function types for the densities include Gaussian or other. In this case it is preferable to re-map the histogram by the histogram transformer into a shape that better resembles a linear combination of the function types to be used in the mixed model fitting. This allows a more robust and accurate fitting by the range identifier RID. In second step, the range identifier uses the so found densities for the two, preferably three (or more classes) to compute the threshold to suitable separate the densities. Various separation schemes are envisaged herein and will be explained in more detail below.

Optionally, there is also a range evaluator RE that assigns the significance index to the mask based on the threshold found by the proposed range identifier RID. The significance index quantifies how well the mask (and hence the threshold) separates the two classes, specifically the class of the RLI and the anatomic class.

The significance index assigned by the range evaluator may be displayed to the user for instance by color or opacity coding the mask. Furthermore, the significance index can be used within the window level-width procedure or other rendering operations for displaying the input image. Therein, the RLI is partly excluded according to the significance index. The significance index allows implementing a "fuzzy" exclusion scheme which will be explained in more detail later.

Although the processing component PC in FIG. 2 is mainly envisaged to operate fully automatically without expecting any input from the user, there may still be an additional input port through which the user may adjust the automatically found threshold $\theta$ as indicated by the optional input symbol in form of the crossed circle in the center of the block diagram in FIG. 2.

In one embodiment, the user selects through a user interface the type (background or opaque) of RLI he or she wishes to process. After processing for the threshold and mask as described above, the system provides a user interface for the user to adjust the computed threshold for the structure image S. The threshold is displayed by overlaying the mask on the input image I. The processing may then be rerun with the adjusted threshold. In this manner, the system and method allow implementing an iterative scheme to find an "optimal" definition (or "outline") of the RLI.

Instead of or in addition to modifying the threshold so found, the proposed system IPS may allow the user the option to modify the significance index found by the range evaluator RE, which controls the partial exclusion of the RLI from the window level—width procedure for displaying the input image.

The specification of the sub-ranges for the ROIs may be in terms of thresholds or mask images as proposed herein but other specifications are not excluded herein.

It should also be noted that the thresholding operation by thresholder TR depends on how the image values in the structure image are encoded. For instance, it is assumed herein that the thresholding works "downwardly". That is, image values less that the threshold are disregarded and considered to represent RLIs whilst image values larger than the threshold are considered to represent ROIs. However, depending on the signage of the image values, an opposite "upwardly" thresholding may be done instead, that is, image values smaller than the threshold may be considered ROIs whilst image values larger than the threshold may be considered to belong to RLIs. Furthermore, if more than one thresholds are determined, the union of respective ROIs, where each corresponds to a single sub-range defined by a lower and upper bound, may together determine the total ROI.

The components of the image processing system IPS or its processing component PC may be implemented as software modules or routines in a single software suit and run on a general purpose computing unit PU such as a workstation associated with the imager IM or a server computer associated with a group of imagers XI. Alternatively, the components of the image processing system IPS may be arranged in a distributed architecture and connected in a suitable communication network.

Operation of the IPS is now illustrated through exemplary imagery with reference to FIGS. 3-5 and we shall revisit these further below when discussing the related method.

Figure 3:
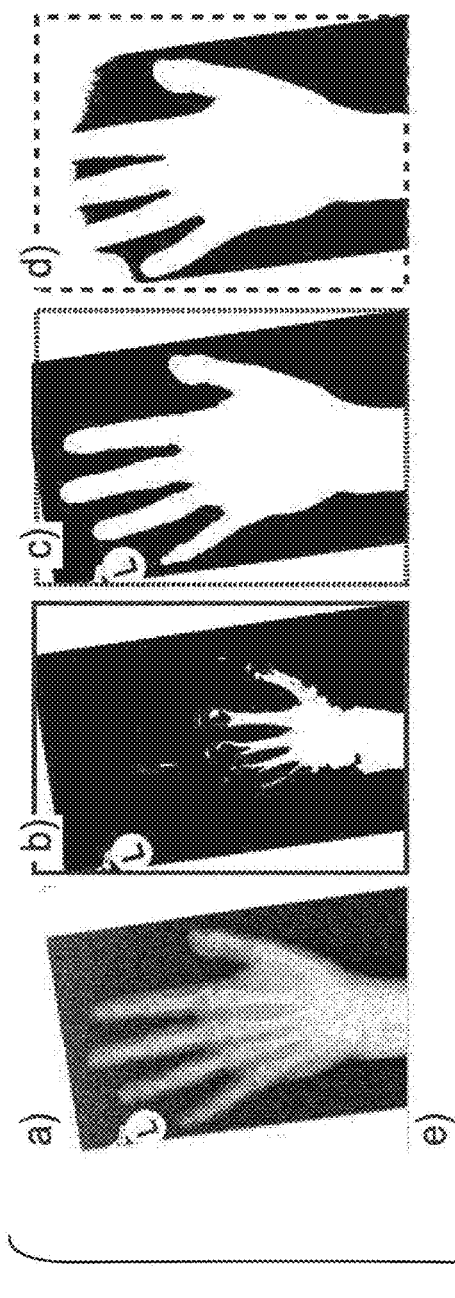
FIG. 3 shows exemplary X-ray imagery with an image histogram to illustrate purely intensity based processing.
Figure 3:
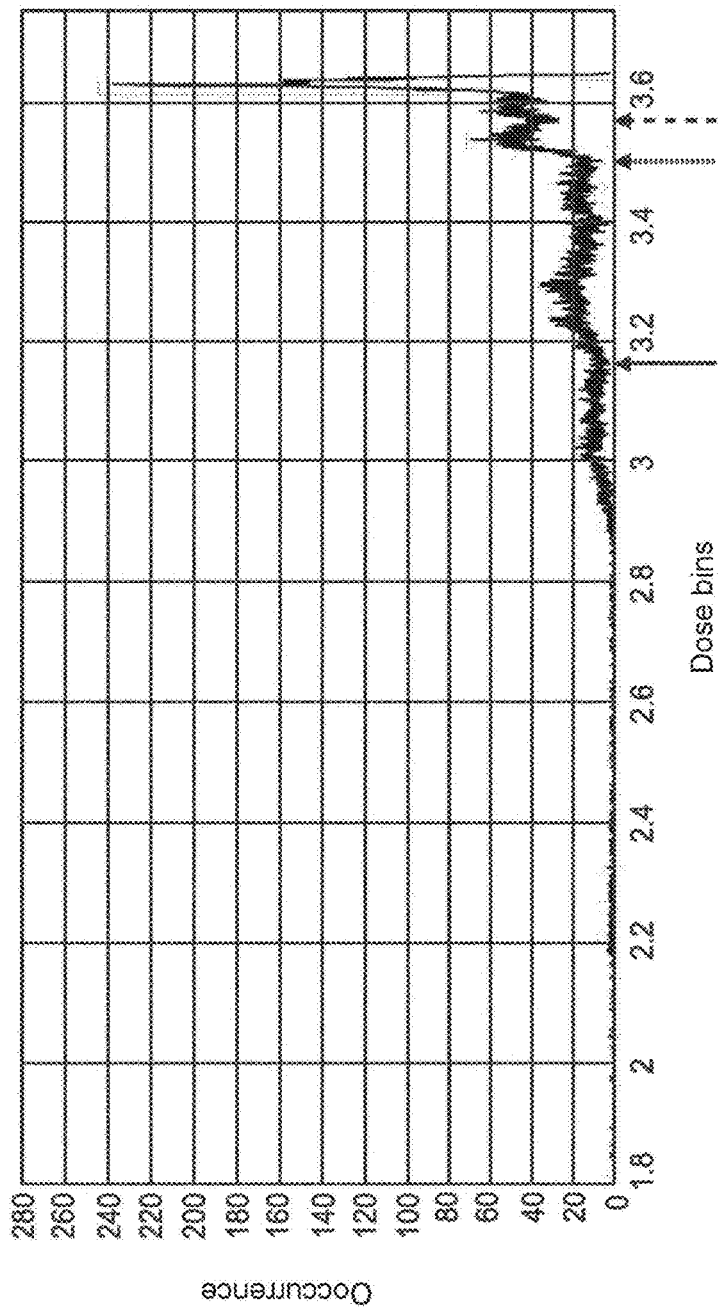

In FIG. 3, the log dose histogram of the X-ray intensities is shown, with occurrence graphed verticals versus dose bins along the horizontal axes. In FIG. 4, the amplitudes of the structure image are shown, with occurrence graphed vertically versus structure amplitude bins along the horizontal axis. In FIG. 5, the amplitudes of the remapped structure histogram are shown, with occurrence graphed vertically versus remapped structure amplitude bins along the horizontal axis.

In more detail, FIG. 3 illustrates what can go wrong if the proposed system is not used. FIG. 3a shows an X-ray image of a hand. The histogram at FIG. 3e of the input image I in FIG. 3 shows three high intensity peaks belonging to the direct radiation area which is superimposed by a global gradient. This makes a purely intensity based determination of a global threshold (for separating direct radiation from the anatomy) ambiguous. This ambiguity is shown by the three arrows. FIGS. 3b-d show the respectively corresponding masks. A similar problem would be encountered in X-ray imagery of the two legs.

Figure 4:
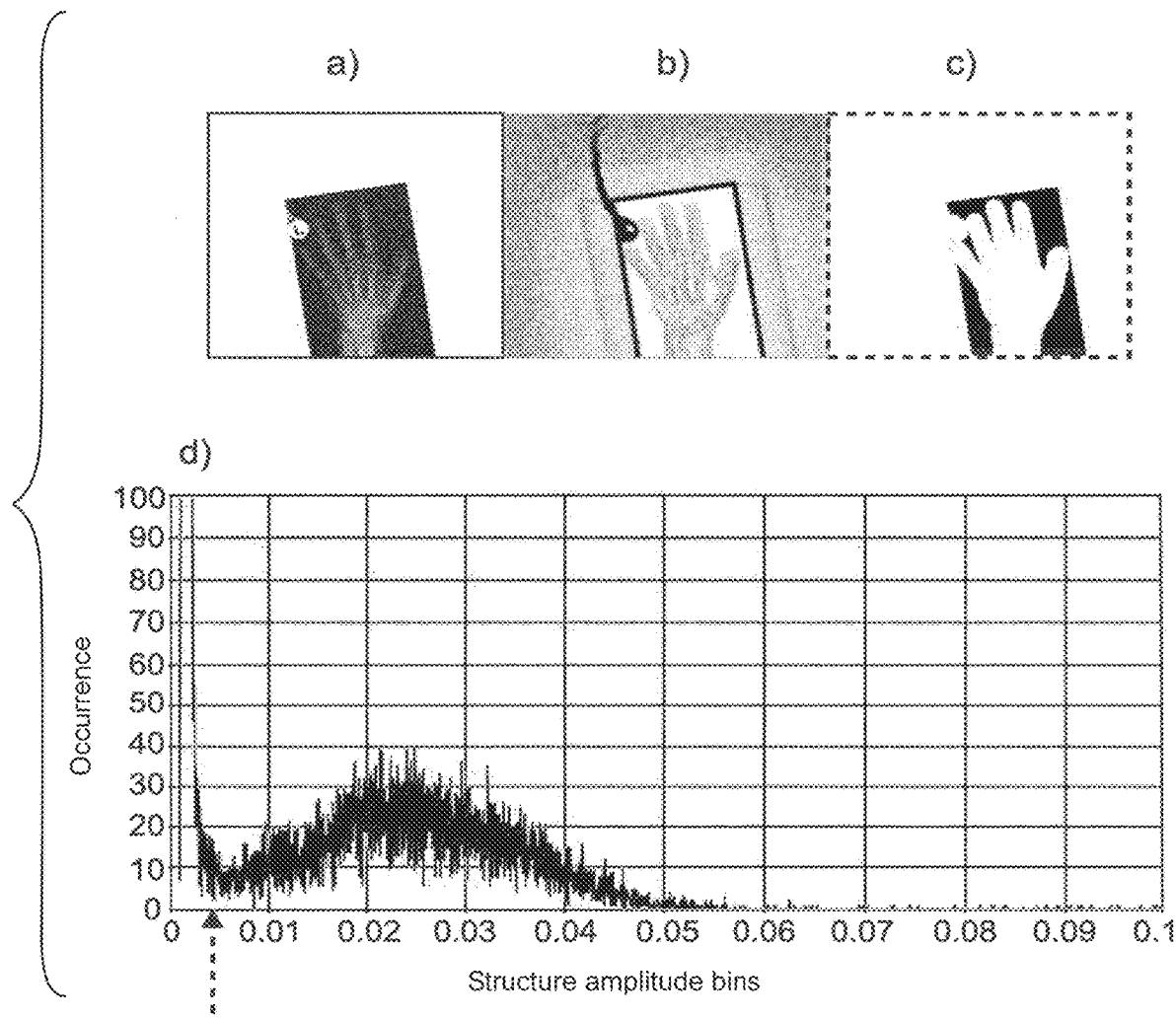
FIG. 4 shows exemplary imagery with a histogram processed by the image processing system of FIG. 1.

In contrast to the situation in FIG. 3, FIG. 4 illustrates the application of the proposed method. In FIG. 4a, the input X-ray image of the hand is shown. In FIG. 4d, the histogram of the structure amplitude image is shown. The structure histogram has only one low structure peak which corresponds to the direct radiation area. The structure amplitudes are the intensities of the structure image 4b). In this histogram, a global threshold $\Theta$ separating direct radiation from the anatomy is well defined as e.g. the first local minimum after the low structure peak. The mask FIG. 4c may be obtained by applying the threshold at $\Theta=0.04$ decades which is indicated as the arrow in the structure amplitude histogram.

Figure 5:
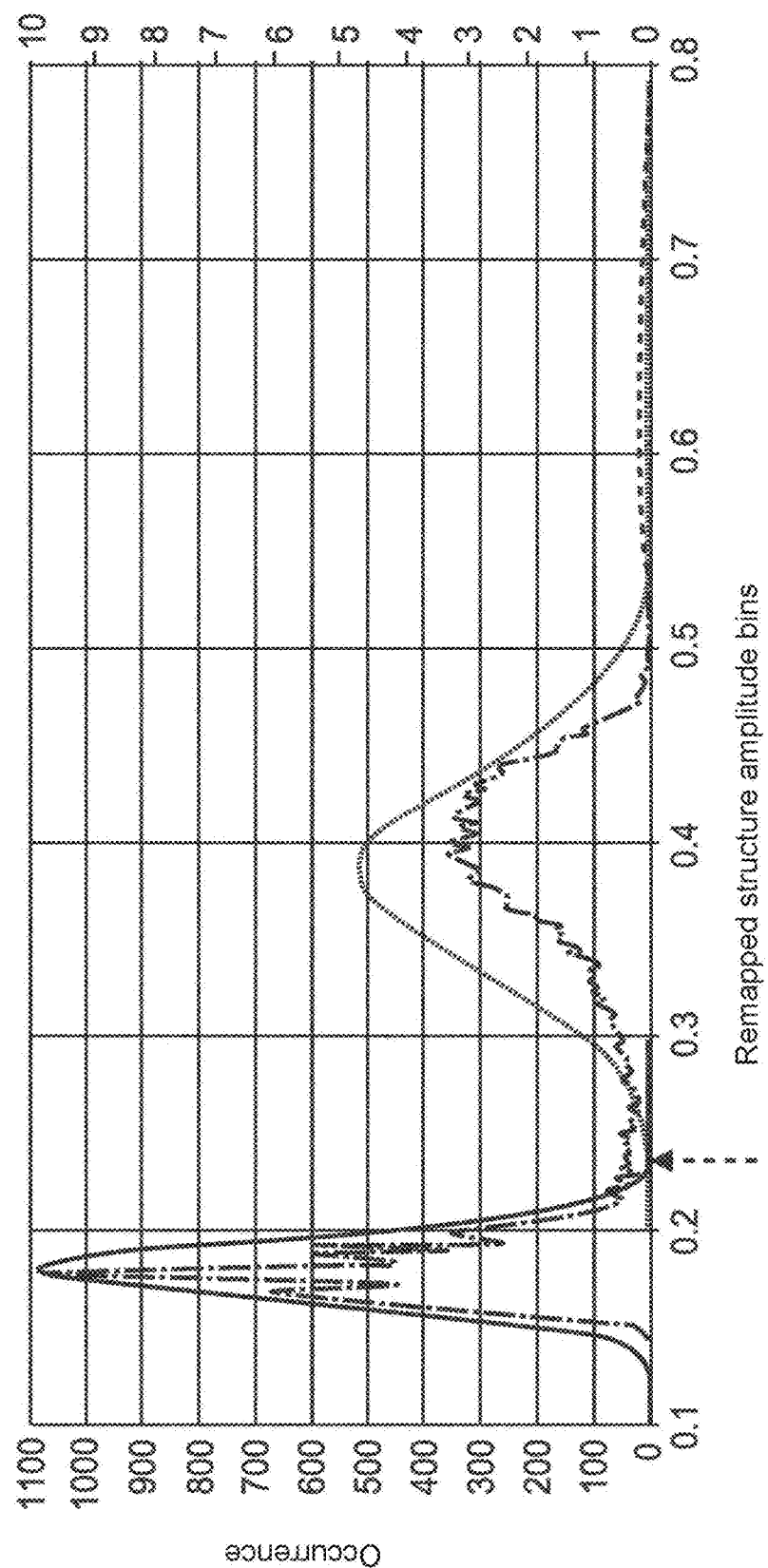
FIG. 5 shows a statistical analysis of a histogram to better illustrate operation of the image processing system of FIG. 1.

FIG. 5 shows the result of the fitting operation. The dot dashed line represents the remapped structure amplitude histogram. The remapping exponent is $\Theta=\frac{1}{4}$ and the scaling is $C=1$, as will be explained in more detail below. Holes in the remapped histogram are filled by area preserving interpolation and the binning size is 64 LSB. The different line types are Gaussian distributions for the low information, anatomy and strong edge class, from left to right. The density for the edge class is very flat, closely following the vertical axis because the data probability and variance for strong edges is very small and large, respectively. The parameters of the Gaussian distributions are obtained by an EM-Algorithm for a Gaussian mixture model. The fitted model parameters are: $\pi1=0.40$, $m1=0.18$, $\sigma1=0.016$, $\pi2=0.59$, $m2=0.39$, $\sigma2=0.05$, $\pi3=0.016$, $m3=0.68$, $\sigma3=0.061$. The vertical arrow at the abscissa indicates the remapped threshold $\Theta r=0.23$ obtained by minimizing a separation error for structure amplitudes within the low information and the anatomy class, as will be explained below at step S630 at FIG. 6. The mentioned number are for illustration only and are not limiting.

Figure 6:
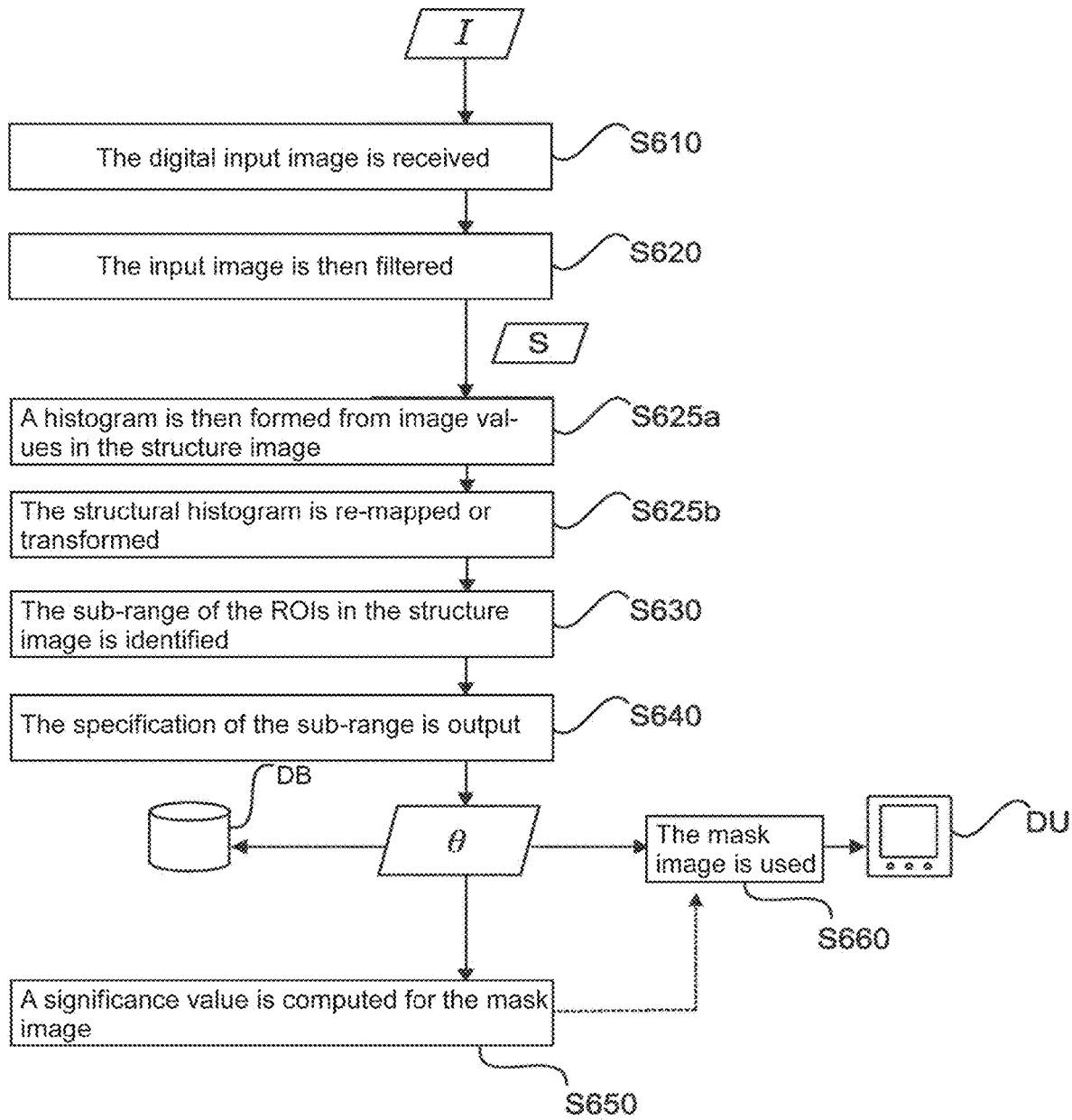
FIG. 6 shows a flow chart of an image processing method.

Referring now to FIG. 6, operation of the proposed image processor is now explained in yet more detail. It will be appreciated however, that the flow chart in FIG. 6 and the description that follows is not necessarily tied to the architecture as laid out in FIGS. 1, 2 and that the algorithm or image processing method as per said flow chart in FIG. 6 can be read as a teaching in its own right also.

At step S610, the digital input image I is received. In the preferred embodiment the input image is an X-ray image acquired by an X-ray imager, however, other imaging modalities are not excluded herein such as MRI or others. The format of the image values is either linear or logarithmic, depending on which type of RLIs one wishes to exclude, such as high dose or low dose. More particularly, not only small-sized details but also noise will be enhanced by local structure enhancement filtering. For a good separation of the low information regions from the anatomical regions, the noise in the low information regions should have smaller amplitudes than in the anatomical regions. This can be ensured by taking advantage of the dose dependence of noise amplitudes in X-ray images. As reported for instance in Applicant's WO 2016/083248, in linear images, where the intensities are proportional to the detected dose, the noise amplitude increases with the intensity. On the other hand, in logarithmic images, where intensities are proportional to the X-ray denseness of object in the X-ray path, the noise amplitude decreases with the intensity. Therefore, for the identification of low dose opaque image regions, linear input images should be used, since in the linear input domain low dose opaque regions have low structure and low noise amplitudes. Analogously, for the identification of high dose direct radiation regions logarithmic input images should be used, since in the logarithmic input domain high dose direct radiation regions have low structure and low noise amplitudes.

At step S620, the input image I is then filtered to obtain the structure image S. More specifically, we define herein the structure image S to be the result of a local spatial structure enhancement filter $F_s$ applied to the original input image I:

$$S=F_s[I]$$

Within the structure image S, pixel values (structure amplitudes) in regions with low information content are small compared to those in anatomical regions, because regions which have low information content typically have very few small-sized details. Large-sized modulation resulting from global gradients or skin lines will be removed by the local spatial structure enhancing filtering. This overcomes the problems illustrated in FIG. 3.

The structure enhancement filter $F_s$ can be any kind of edge sensitive filter. Examples are differences of Gaussians or differences of rank filters. Preferably and in one embodiment, a combination of two types of filters are used. In an exemplary embodiment, the difference of the maximum and minimum in an e.g. n×n mask followed by a n×n box filter leads to well separated low structure amplitudes with acceptable computing effort:

$$F_s=B_n*(MAX_n-MIN_n)$$

In one exemplary embodiment, n=5 was chosen but other values for n, e.g. n=3 or larger values are also envisaged. The structure image S has a certain range of image values.

At step S625A a histogram is then formed from image values in the structure image S.

In an optional step S625B, the structural histogram obtained at step S625A is re-mapped or transformed to change the shape of the histogram of the structure image. In this embodiment, the histogram formed in step S625a is merely an intermediate histogram which is then transformed into its final shape at step S625b.

Preferably, the function types used for transforming such as exponential or other, corresponds to the function type to be used in the following step S630 as will now be explained in more detail. For the automatic determination of the low information separation threshold, we envisage in one embodiment (but not necessarily all embodiments) a Gaussian mixture model to the structure of the amplitude data in the transformed histogram of S. See for instance, Dempster et al in "Maximum Likelihood from Incomplete Data via the EM Algorithm", Journal of the Royal Statistical Society. Series B (Methodological), Vol. 39, No. 1. (1977), pp. 1-38. To support this fitting operation, we propose to remap the structure amplitude histogram in order to obtain a distribution which is more similar to the superposition of Gaussian distributions. This can be motivated as follows: as illustrated above in FIG. 4, the structure amplitude histogram in FIG. 3 has a single, well-defined peak at low structure amplitudes. This allows for a good separation of low information regions by means of thresholding. Furthermore, the histogram has a bimodal shape with a long tail corresponding to strong edges which occur at collimation borders or skin lines. This suggests, as already mentioned, a statistical three-class model, where the three classes are:

1. The low information content class (RLI) which contains pixels with small structure amplitudes (typically smaller than 0.005 decades).
2. The anatomical class which contains anatomical pixels with structure amplitudes typically around 0.02 decades.
3. (Strong) edge class which contains strong edge pixels which occur at collimation borders or skin lines. Typically, there is a long tail (see FIG. 5) in the structure amplitude histogram ranges from 0.05 to 0.1 decades.

However, especially the low information content peak in the structure amplitude histogram is asymmetric. Its maximum is close to zero while amplitudes are limited by zero. Consequently, the class peaks have not a Gaussian shape. On the other hand, statistical methods like the EM-Algorithm can be easily applied only to Gaussian mixture models. Therefore, we remap the structure amplitude histogram in order to get a remapped histogram with peaks that have shapes which are closer to Gaussian distributions. In particular, the remapping is to achieve a more symmetric shape. This reshaping can be achieved by applying a shape shifter function $f$ which stretches the low structure amplitudes and compresses the high structure amplitudes. One possible class of shape shifter functions $f$ is:

$$s^r = f(s),$$

where $f$ is a monotonically increasing function with monotonically decreasing first derivative. Several functions fulfill these requirements. Examples are the logarithmic and a power functions with an exponent between zero and one. In an exemplary embodiment we use a power function as per:

$$f(s) = Cs^\beta, \text{ with } C>0 \text{ and } 0<\beta<1.$$

In order to save computational effort, we apply this remapping function not to the structure image but to the structure amplitude histogram as illustrated in FIG. 3. "Holes" in the remapped histogram that can potentially occur at high slopes of the remapping function $f$ are filled by area preserving interpolation. The prevention of holes in the histogram makes the fitting of the mixture model more robust. In other words, the area under the structure histogram is preserved. In an alternative embodiment, the remapping can be done on the structure image instead and the histogram is taken on the so remapped structure image to obtain the structure histogram.

FIG. 5 shows the remapped structure amplitude histogram with $\beta=\frac{1}{4}$ and $C=1$. Since this remapping stretches the low intensity peak, it makes the successive fitting of the Gaussian mixture model and the determination of the separation threshold more robust and accurate.

At step S630, the sub-range of the ROIs in the structure image is then identified. This identification step is based on the histogram of the structure image, or of its transformed version. In the following it is assumed that indeed the method proceeds on the transformed structure histogram but all that will be said below is of equal application to the untransformed histogram of the structure image.

The identification step S620 preferably includes two sub steps: in the first step which is based in the preferred embodiment on a statistical approach, a statistical mixture model is fitted to the structure histogram. Preferably three classes are assumed to exist and respectively, three probability densities are then computed in the statistical mixture model fitting, one density for each class. In the second sub-step, a separation algorithm is then performed based on a separation criterion to find the best separation between two of the probability densities found, namely the density the RLIs and the density that corresponds to the anatomic class.

In more detail, and according to a preferred embodiment, the statistical mixture model is fitted to the remapped histogram as per the following ansatz:

$$P(s^r) = \sum_{i=1}^{n} \pi_i P_i(s^r | i) \quad (1)$$

In (1), index i denotes the class number and index n the number of classes, which preferably equals 3. $P(s^r)$ is the PDF for the remapped structure amplitude $s^r$ and $P(s^r|i)$ is the conditional PDF for the remapped structure amplitude in the class i. The total class probability is denoted by $\pi_i$.

For the remapped structure amplitude histogram, the conditional PDFs are modelled by Gaussian distributions:

$$P_i(s^r|i) = G(s^r; m_i, \sigma_i),$$

with $$G(s^r; m_i, \sigma_i) = \frac{1}{\sqrt{2\pi\sigma_i^2}} e^{-\frac{(s^r - m_i)^2}{2\sigma_i^2}}$$

For the sake of definiteness, assuming the three-class mixture model (n=3), that has 9 free parameters: $\{\pi_i, m_i, \sigma_i | i=1, \ldots, 3\}$ with $\pi_i$ the class probability, $m_i$ the mean ???? and $\sigma_i$ the standard deviation.

The EM-Algorithm is a powerful statistical algorithm which allows for the robust determination of the unknown parameters even for incomplete data, e.g. when holes occur in the histogram during mapping. The mixture model belonging to the remapped structure amplitudes of the hand image of FIG. 4 is shown in FIG. 5. Mixed model fitting algorithms other than the EM-algorithm are also envisaged in alternative embodiments.

Once the free parameters of the mixture model have been determined, the remapped separation threshold $\Theta r$ between the low information and the anatomical class can be determined in the second sub-step. In one embodiment, minimization of a separation error is carried out. The Separation error concept as envisaged herein in one embodiment for finding the threshold may be likened to statistical hypothesis testing. The separation error is the error induced by binary thresholding the remapped structure amplitudes. In other words, the separation error as defined herein in one embodiment is the probability for wrong classification of remapped structure amplitudes by a binary threshold based separation. This separation error probability $P_e$ ($\theta^r$) is given by:

$$P_e(\theta^r) = \int_{s^r=\theta^r}^{\infty} \pi_1 G(s^r; m_1, \sigma_1) ds^r + \int_{s^r=-\infty}^{\theta^r} \pi_2 G(s^r; m_2, \sigma_2) ds^r \quad (2)$$

The separation threshold $\theta^r$ leading to minimal separation error probability can be found by optimizing (in this case, minimizing) the above integral sum (2), for instance by setting the first derivate of the separation error with respect to $\Theta^r$ to zero:

$$P_e'(\Theta^r) = 0$$

This is a necessary condition for a minimal separation error. With the fundamental theorem of calculus, this leads to $$\pi_1 G(\theta^r; m_1, \sigma_1) = \pi_2 G(\theta^r; m_2, \sigma_2).$$

This means the thresholds minimizing the separation error are intersection points of the two Gaussian distributions. The above equation leads to a quadratic equation for the remapped separation threshold:

$$a_2 \theta^{r^2} + a_1 \theta^r + a_0 = 0$$

$$a_2 = \frac{1}{\sigma_1^2} - \frac{1}{\sigma_2^2}$$

$$a_1 = \frac{m_1}{\sigma_1^2} - \frac{m_2}{\sigma_2^2}$$

$$a_0 = \frac{m_1^2}{\sigma_1^2} - \frac{m_2^2}{\sigma_2^2} - 2\ln\left(\frac{\sigma_1 \pi_1}{\sigma_2 \pi_2}\right)$$

The quadratic equation has none, one or two solutions. In case of two solutions, the one with lower separation error is chosen. In case of no solution, the two Gaussian distributions have no intersection point and no threshold can be found. This can be the case, if there is no significant low information region inside the X-ray image. One way to quantify said significance will be explained below at step S650.

In other embodiments, where more complex densities or distributions are used. the minimization of the separation error probability $P_e(\theta^r)$ at (1) may be achieved instead by numerical approximation techniques, such as conjugate gradients or others. "Minimization" does not necessarily imply that a global minimum is sought, as finding a local minimum is usually sufficient. Also, if an iterative minimization scheme is used, it may be sufficient to abort the iterations after a pre-set number of iterations or once sufficient convergence has been achieved. Instead of using a minimization as above in (1), it may be more beneficial in other embodiments to formulate the separation error probability is terms of a maximization problem.

From the remapped threshold, the separation threshold can be obtained by applying the inverse remapping function:

$$\theta = f^{-1}(\theta^r)$$

Other separation schemes for any two of the three classes are also envisaged.

As mentioned earlier, if other than Gaussian-type distributions are fitted in the mixed model fitting operation, the remapping will likewise be based on said other type of densities instead of the Gaussians.

As explained earlier, the statistical approach, although preferable and shown to yield good results, are not mandatory and other, even non-statistical, separation schemes may also be used that are suitable to deal with latent variables. For instance, a principal component analysis may be performed instead on the structure histogram to identify the three classes or clusters. The principal component analysis may be performed in the parameter space that includes all parameters used to parameterize the underlying function classes. In yet other embodiments, Hidden Markov models are used. In simpler embodiments, a purely geometric approach is used. In this embodiment, the location of the two peaks (or local maxima) of two of the densities is determined and the threshold is then defined as the center point or other average between those two locations. Preferably, the two distributions with the largest peaks are processed in this manner, which will generally correspond to the two classes of main interest herein, the RLI class and the anatomic class.

The above step S630 may be performed in addition or instead for any other selection of two classes from the three classes. For instance, in another embodiment one may wish to distinguish the edge class from the RLI, etc.

In step S640 at the specification of the sub-range is then outputted. The output can take many forms but preferably includes the threshold as computed in the previous step at S630. In addition or instead, the output may include the (binary)mask formed from applying the threshold against the structure image. Specifically, with the separation threshold $\theta$, the low information mask $M_\Theta$ can be determined by applying the thresholding described to the structure image S. The application of this threshold to the structure image S yields the mask (image) $M_\Theta$ which describes the region of low information content (RLI):

$$M_\theta(x) = \begin{cases} 1 & \text{if } S(x) \geq \theta \\ 0 & \text{otherwise} \end{cases}$$

In the above equation x describes the pixel position within the structure image. The threshold $\theta$ determines both, the RLIs and ROIs: RLI={x|p(x)<$\theta$} and ROI={x|p(x)≥$\theta$}. It can also be seen, the that the threshold $\theta$, once computed, uniquely determines the mask $M_\theta$.

The mask image $M_\theta$ for the direct radiation area resulting from the application of (global) threshold $\theta$ is displayed in pane c) of FIG. 4. The threshold is indicated as an arrow in the structure amplitude histogram in pane d) of FIG. 4.

In step S660, the mask image $M_\Theta$ associated with the threshold is then used to render the input image I for display. The visualization is achieved by mapping only the ROI pixels outside the mask image $M_\Theta$ as identified in step S640 to brightness values which are then used to control the operation of suitable video circuitry of the display unit. In other words, in the mapping for visualization, only the image values in the computed ROI are considered. Image values inside the RLI are not used for the mapping.

In optional step S650, a significance value is computed for the mask image $M_\Theta$ as identified in step S640. More particularly a respective weight for the image values in the sub range is computed.

In either case the weight or the significance quantifies a goodness of separation between the two classes, preferably between the RLI class and the anatomic class. More generally the weight represents preferably a statistical significance of the RLI as computed at step S640.

In more detail, in case where the anatomy covers the whole collimated area, there is no direct radiation RLIs recorded in the X-ray image I. Analogously, for identification task in relation to opaque RLIs, there will be cases where there are no opaque objects between X-ray source and detector during imaging and hence, again, no such RLIs are recorded in image I.

Since our statistical model according to the preferred embodiment assumes 3 classes, including the low information class RLI, the automated threshold identification at step S630 may incorrectly determine the threshold and hence the low information mask, in case of absent low information regions RLI.

In addition to the separation error $P_e(\Theta^r)$, also a dose ratio $R_d$ contributes to the significance of the detected low information mask $M_\Theta$. For direct radiation detection, the dose ratio $R_d$ is defined as the ratio of the median linear dose inside and outside the low information mask $M_\Theta$. For opaque object detection, the dose ratio $R_d$ is defined the other way round.

It is hence proposed herein to capture at least these two influences for the significance measure, the separation error $P_e(\Theta^r)$ and the dose ratio $R_d$. According to one embodiment, the significance measure is configured as a product of two factors, each representing the respective ones of the two influences. Preferably, the product normalized for unity.

In one exemplary embodiment, we define the significance $S_M$ of the detected low information mask $M_\Theta$ as follows:

$$S_M(P_e(\theta^r), r_d) = \left(1 - \frac{P_e(\theta^r) - P_e^{min}}{P_e^{max} - P_e^{min}}\right)\left(\frac{R_d - R_d^{min}}{R_d^{max} - R_d^{min}}\right) \quad (3)$$

Preferably, $P_e(\Theta^r)$ and the dose ratio $R_d$ are clamped to their respective minimum and maximum values to thereby achieve normalization of the above product definition for the significance measure as per:

$$P_e^{min} \leq P_e(\theta^r) \leq P_e^{max}, R_d^{min} \leq R_d \leq R_d^{max}.$$

Thus, the significance $S_M$ is a number between zero and one. Feasible min and max values are:

$P_e^{min} = 0.02$ $P_e^{max} = 0.40$ $R_d^{min} = 1.00$ $R_d^{max} = 1.75$

However, these values are merely exemplary embodiments, and other values may equally work in other contexts and can be found by simple experimentation on test imagery.

The significance weights computed at step S650 can be used for record keeping or teaching purposes but preferably can be used to control the rendering at step S660. So rather than performing a hard-thresholding as explained above, where image values outside the ROI are not considered for the mapping, the proposed significance weight may be used to control the rendering operation at step S660. More particularly, a fuzzy scheme may be constructed instead. Specifically, with the significance $S_M$ of the identified low information mask $M_\Theta$, to, some or all pixels under (i.e., excluded by) the mask, a fuzzy weight can be assigned:

$$W_M = 1 - S_M$$

Specifically, in the rendering operation at step S660, e.g. when the new histogram analysis is performed on the identified ROI in the input image to find the contrast and brightness adaptation, pixels actually excluded by the mask $M_\Theta$ may then still contribute, as per their weight $W_M$ instead of completely excluding them from the histogram. Thus pixels under a non-significant mask ($S_M=0$) will completely contribute to the histogram and pixels under a full-significant ($S_M=1$) mask will be completely excluded from the histogram. In the other cases, $0<S_M<1$, there is then a partial contribution as per the weight $W_M$. The partial contribution can be implemented by at least partially admitting, as per the weight $W_M$, the otherwise excluded image values into the histogram analysis for the contrast-brightness or window level/window width analysis.

As another variant of the displaying step at S660, instead of or in addition to displaying of the input image based on the sub-range rendering, it is the binary mask itself that is displayed in step S660. The significance values attachable to the image values in the RLI may be used to visually encode the binary mask visualisation. Specifically, and in one embodiment, the significance measure or index is normalized, so ranges between 0 and 1 and the index can be assigned to the mask. If the mask is displayed as a color map, the significance can be coded in a color map as saturation or opacity. In one exemplary embodiment, full significance (which corresponds to an index value of "1") leads to a fully saturated or completely opaque color map. No significance (which corresponds to an index value of "0") leads to fully unsaturated (grey) or completely transparent color map. Other visual encoding schemes for the mask in relation to the significance index are also envisaged.

In the proposed method, preferably each pixel of the structure image S is classified relative to the threshold. This results in the mask having a resolution comparable to that of the structure image S or of the input image I. In the alternative, rather than processing the structure image pixel-by-pixel, it may be useful in some cases to coarsen the imagery into blocks of multiple pixels by under-sampling or other method and to then process these blocks of the coarsened images instead.

Preferably, the system IPS includes user interfaces, to adjust the threshold and/or significance measure or some or all of the above defined parameters, such as parameters of the shape shifter function and/or the min/max values for the Pe and $R_d$ values.

As explained above, the definitions of some of the quantities such as $R_d$ and other depend on whether the RLIs to be found are of the full exposure type (e.g. background) or of the opaque type (such as shadows of X-ray protectors, etc.). A user interface may be provided for the user to feedback to the system IPS which type of RLIs are to be identified. Alternatively, the system runs the method for both and produces two thresholds. If more than one threshold is determined, the set-theoretic union of the corresponding ROIs for two (or more) thresholds may together determine the ROIs.

Otherwise a single threshold is returned for one type, if the threshold for the other type cannot be found (e.g., if there is no real-number solution in the quadratic above) or the system returns only the threshold with the higher significance. If no real-number solution for the threshold can be found, this fact may be indicated to the user by a suitable alert signal displayed on display DU or by an audio signal, etc. The user may then be invited to change some of the parameters mentioned above and request the computations to be rerun. In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium (in particular, but not necessarily, a non-transitory medium), such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage.

Any reference signs in the claims should not be construed as limiting the scope.

Abbreviations

| | |
|---|---|
| EM | Expectation Maximization |
| LSB | Least Significant Bit: Unit for digital pixel intensity values |
| PDF | Probability Density Function |
| ROI | Region of Interest |
| RLI | Region of low information content (see also below) |

Definitions

| | |
|---|---|
| $F_s$ | Local structure enhancement filter |
| $B_n$ | Box filter with a filter mask of size n × n |
| $MAX_n$ | Maximum filter with a filter mask of size n × n |
| $MIN_n$ | Minimum filter with a filter mask of size n × n |
| * | Concatenation of image operations: A*B means A is applied after B. |
| I | Original image: intensities are proportional to either linear or logarithmic dose |
| S | Structure image obtain by local spatial structure enhancement filtering |
| s | Structure amplitude, which is the intensity at a certain pixel within the structure image S |
| $s^r$ | Remapped structure amplitude, which is the intensity value in the remapped structure amplitude histogram |
| $\Theta$ | Structure threshold separating regions with low information content from anatomical image regions |
| $\Theta^r$ | Remapped structure threshold separating regions with low information content from anatomical image regions in the remapped structure histogram |
| $P_e(\Theta^r)$ | Separation error, which is the probability for wrong classification by a separation threshold $\Theta^r$ applied to the remapped structure amplitudes |
| $M_\Theta$ | Mask resulting from the application of a structure threshold $\Theta$ to the structure image |
| $S_M$ | Significance of mask M |
| $R_d$ | Ratio of median linear doses inside and outside $M_\Theta$ or median of linear does outside and inside $M_\Theta$ |
| $X = (x1, \ldots, xj)$, $j = 2, 3, \ldots$ | Spatial pixel position in an image |
| Direct radiation (type of RLI) | Region in the X-ray image, where X-rays directly radiated the detector without passing an object |
| Opaque region (type of RLI) | Regions in the X-ray image, where highly absorbing objects are in the X-ray path between X-ray tube and detector |
| Region with low information content (RLI) | Region in the image which has low diagnostic information. For example, direct radiation area or opaque region associated with radiation opaque objects, such as X-ray protectors, etc |

The following aspects relate to embodiments described herein:
1. An image processing system (IPS), comprising:
  an input interface (IN) configured for receiving an input image;
  a filter (FIL) configured to filter said input image to obtain a structure image from said input image, said structure image including a range of image values;
  a range identifier (RID) configured to identify, based on an image histogram for said structure image, an image value sub-range within said range, said sub-range being associated with a region of interest; and
  an output interface (OUT) for outputting i) a specification for said image value sub-range and/or ii) a mask image associated with the sub-range and configured to indicate the region of interest, and/or iii) a complementary mask image associated with the complement of said sub-range, and configured to indicate the complement of said region of interest.
2. System of aspect 1, comprising a histogram former (HF) configured to form said image histogram by forming said image histogram from image values in the structure image or, further comprising a histogram transformer (HT), the histogram former (HF) configured to i) form an intermediate image histogram for image values in the structure image and the histogram transformer (HT) configured to transform said intermediate image histogram into said image histogram or ii) to transform the input image into an intermediate image and to form the histogram from said intermediate image.
3. System of aspect 1 or 2, wherein said histogram transformer (HT) is configured to apply an area preserving interpolation when transforming the intermediate image histogram.
4. System of any one of the previous aspect, further comprising an image renderer (IR) configured to render a visualization on a display unit (DU) of said input image based on the mask for the region of interest.
5. System of claim of any one of the previous aspects 1-3, further including an image value range evaluator (RE) configured to compute a respective weight for the image values outside the sub-range, said weight determining a contribution of the respective image values in a visualization of the input image.
6. System of aspect 5, wherein the or an image renderer (IR) is configured to render a visualization on a display unit (DU) of said input image whilst a contribution of the image value inside the RLI for a contrast and/or brightness adaptation is according to said weight.
7. System of any one of aspects 5-6, wherein the image renderer (IR) is configured to render a visualization on a display unit (DU) of said mask for the complement of the region of interest, preferably with a visualization scheme that represents the weight computed by the image value range evaluator (RE).
8. System of any one of the previous aspects, wherein the range identifier (RID) is configured to identify said sub-range by fitting a statistical mixture model to the image histogram or to the transformed image histogram.
9. System of aspect 8, wherein the statistical mixture model includes at least two components.
10. System of aspect 9, wherein one of the components corresponds to background or a radio-opaque object whilst the at least one other component corresponds to one or more anatomical structures of interest.
11. System of aspect 10, wherein the statistical mixture model includes at least three components, wherein the at least one further component corresponds to an edge structure.
12. Method of image processing, comprising the steps of:
  receiving (S610) an input image;
  filtering (S620) said input image to obtain a structure image from said input image, said structure image including a range of image values at different image locations;
  identifying (S630), based on an image histogram for said structure image, an image value sub-range within said range, said sub-range being associated with a region of interest; and
  outputting (S640) i) a specification for said image value sub-range and/or ii) a mask image associated with the sub-range and configured to indicate the region of interest, and/or iii) a complementary mask image associated with the complement of said sub-range, and configured to indicate the complement of said region of interest.
13. An imaging arrangement (IA), comprising:
  an imaging apparatus (XI) and a system (IPS) as per any one of the previous aspects.
14. A computer program element, which, when being executed by at least one processing unit (PU), is adapted to cause the processing unit (PU) to perform the method as per aspect 12.
15. A computer readable medium having stored thereon the program element of aspect 14.

The invention claimed is:
1. An image processing system, comprising:
  a memory that stores a plurality of instructions; and
  processor circuitry that couples to the memory and that is configured to execute the plurality of instructions to:
    receive an input image;
    filter said input image to obtain a structure image from said input image, said structure image including a range of image values;
    identify, based on an image histogram for said structure image, an image value sub-range within said range, said sub-range being associated with a region of interest;
    output at least one of:
      a specification for said image value sub-range,
      a mask image associated with the sub-range and configured to indicate the region of interest,
      a complementary mask image associated with a complement of said sub-range, and configured to indicate the complement of said region of interest, and
    compute a respective weight for the image values outside the sub-range, said weight determining a contribution of the respective image values in a visualization of the input image, wherein said weight measures a separation between two classes of at least two classes,
  wherein one class of the two classes corresponds to the region of interest, and wherein the other class of the two classes corresponds to the background or to at least one radio-opaque object.
2. The system of claim 1, wherein the processor circuitry is further configured to form said image histogram by forming said image histogram from image value, and wherein the processor circuitry is further configured to form an intermediate image histogram for image values in the structure image and the processor circuitry is further configured to transform said intermediate image histogram into said image histogram, or to transform the input image into an intermediate image and to form the histogram from said intermediate image.

3. The system of claim 2, wherein the processor circuitry is further configured to apply an area preserving interpolation when transforming the intermediate image histogram.

4. The system of claim 1, wherein the processor circuitry is further configured to render a visualization on a display unit of said input image based on the mask image for the region of interest.

5. The system of claim 1, wherein the processor circuitry is further configured to render a visualization on a display unit of said input image whilst a contribution of one of the image values inside a region, which is not included in the region of interest for a contrast and/or brightness adaptation is according to said weight.

6. The system of claim 5, where the processor circuitry is further configured to render a visualization on a display unit of the complementary mask image for the complement of the region of interest, with a visualization scheme that represents the weight computed by the processor circuitry.

7. The system of claim 1, wherein the processor circuitry is further configured to identify said sub-range by fitting a statistical mixture model to the image histogram or to the transformed image histogram.

8. The system of claim 7, wherein the statistical mixture model includes at least two components corresponding to the at least two classes.

9. The system of claim 8, wherein one of the components corresponds to the background or to the at least one radio-opaque object whilst the at least one other component corresponds to the region of interest including one or more anatomical structures of interest.

10. The system of claim 9, wherein the statistical mixture model includes at least three components, wherein the at least one further component corresponds to an edge structure.

11. The system of claim 1, wherein the other class of the two classes for the separation measured by the weight corresponds to a region not included in the region of interest.

12. The system of claim 1, wherein the two classes for the separation measured by the weight correspond to two regions in the same input image, respectively, and
one of the two regions includes the region of interest, and the other region of the two regions includes the background or the at least one radio-opaque object.

13. A method for image processing, comprising:
receiving an input image;
filtering said input image to obtain a structure image from said input image, said structure image including a range of image values at different image locations;
identifying, based on an image histogram for said structure image, an image value sub-range within said range, said sub-range being associated with a region of interest;
outputting at least one of,
a specification for said image value sub-range,
a mask image associated with the sub-range and configured to indicate the region of interest, and
a complementary mask image associated with a complement of said sub-range, and indicating the complement of said region of interest; and
computing a respective weight for the image values outside the sub-range, said weight determining a contribution of the respective image values in a visualization of the input image, wherein said weight measures a separation between two classes of at least two classes,
wherein one class of the two classes corresponds to the region of interest, and wherein the other class of the two classes corresponds to the background or to at least one radio-opaque object.

14. A non-transitory computer-readable medium having one or more executable instructions stored thereon which, when executed by at least one processor, cause the at least one processor to perform a method for image processing, the method comprising:
receiving an input image;
filtering said input image to obtain a structure image from said input image, said structure image including a range of image values at different image locations;
identifying, based on an image histogram for said structure image, an image value sub-range within said range, said sub-range being associated with a region of interest;
outputting at least one of;
a specification for said image value sub-range,
a mask image associated with the sub-range and configured to indicate the region of interest, and
a complementary mask image associated with a complement of said sub-range, and configured to indicate the complement of said region of interest; and
computing a respective weight for the image values outside the sub-range, said weight determining a contribution of the respective image values in a visualization of the least two classes,
wherein one class of the two classes corresponds to the region of interest and wherein the other class of the two classes corresponds to the background or to at least one radio-opaque object.

* * * * *